United States Patent
Acikgoez et al.

(10) Patent No.: US 10,991,999 B2
(45) Date of Patent: Apr. 27, 2021

(54) ENERGY STORAGE SYSTEM FOR A MOTOR VEHICLE, MOTOR VEHICLE AND METHOD FOR PRODUCING AN ENERGY STORAGE SYSTEM

(71) Applicant: AUDI AG, Ingolstadt (DE)

(72) Inventors: Erdal Acikgoez, Reichertshofen (DE); Mario Boehme, Beilngries (DE)

(73) Assignee: AUDI AG, Ingolstadt (DE)

( * ) Notice: Subject to any disclaimer, the term of this patent is extended or adjusted under 35 U.S.C. 154(b) by 146 days.

(21) Appl. No.: 15/705,618

(22) Filed: Sep. 15, 2017

(65) Prior Publication Data

US 2018/0083329 A1 Mar. 22, 2018

(30) Foreign Application Priority Data

Sep. 19, 2016 (DE) ...................... 10 2016 217 895.4

(51) Int. Cl.
| | |
|---|---|
| *H01M 10/6567* | (2014.01) |
| *H01M 50/20* | (2021.01) |
| *H01M 10/613* | (2014.01) |
| *H01M 10/625* | (2014.01) |
| *H01M 50/30* | (2021.01) |

(Continued)

(52) U.S. Cl.
CPC ..... *H01M 10/6567* (2015.04); *H01M 10/613* (2015.04); *H01M 10/625* (2015.04); *H01M 50/20* (2021.01); *H01M 10/60* (2015.04); *H01M 10/61* (2015.04); *H01M 10/65* (2015.04);

(Continued)

(58) Field of Classification Search
CPC .......... H01M 10/6567; H01M 10/613; H01M 10/625; H01M 2/1072; H01M 2/1077; H01M 2/12; H01M 2220/20; H01M 2/1083; H01M 2/1088; H01M 10/60–6567; H01M 2/02–0447; H01M 10/656

See application file for complete search history.

(56) References Cited

U.S. PATENT DOCUMENTS

2010/0099015 A1* 4/2010 Kawai ................. H01M 10/613
429/62
2013/0260195 A1 10/2013 Long (Continued)

FOREIGN PATENT DOCUMENTS

| CN | 202495556 | * 10/2012 | .......... H01M 10/613 |
| CN | 202495556 U | 10/2012 | |

(Continued)

OTHER PUBLICATIONS

English Translation of CN202495556.*

(Continued)

*Primary Examiner* — Milton I Cano
*Assistant Examiner* — Kiran Akhtar
(74) *Attorney, Agent, or Firm* — Maier & Maier, PLLC

(57) ABSTRACT

An energy storage system for a motor vehicle including an electric energy storage device and a housing-like carrier element for the energy storage device. A liquid heat-conducting medium is arranged in an intermediate space between the carrier element and the energy storage device by which the energy storage device is thermally coupled to the carrier element. A sealing element is provided extending between the carrier element and the energy storage device, which prevents the heat-conducting medium from flowing out from the intermediate space.

6 Claims, 2 Drawing Sheets

(51) Int. Cl.
 *H01M 10/656* (2014.01)
 *H01M 10/60* (2014.01)
 *H01M 10/61* (2014.01)
 *H01M 10/65* (2014.01)

(52) U.S. Cl.
 CPC ......... *H01M 10/656* (2015.04); *H01M 50/30* (2021.01); *H01M 2220/20* (2013.01)

(56) References Cited

U.S. PATENT DOCUMENTS

| | | | | |
|---|---|---|---|---|
| 2015/0147639 | A1* | 5/2015 | Uchida | H01M 2/1094 429/185 |
| 2016/0156080 | A1* | 6/2016 | Enning | H01M 10/613 429/83 |
| 2019/0326565 | A1 | 10/2019 | Zhou et al. | |

FOREIGN PATENT DOCUMENTS

| | | |
|---|---|---|
| CN | 204614833 U | 9/2015 |
| CN | 105377603 A | 3/2016 |
| CN | 105762316 A | 7/2016 |
| DE | 102007050506 A1 | 4/2009 |
| DE | 102008059969 A1 | 6/2010 |
| DE | 102009006426 A1 | 7/2010 |
| DE | 102010019037 A1 | 8/2011 |
| EP | 1178557 A2 | 2/2002 |
| WO | WO2015/007361 * 1/2015 ............... B60K 1/04 |

OTHER PUBLICATIONS

Examination Report dated Jun. 16, 2017 of corresponding German application No. 102016217895.4; 6 pgs.

Office Action dated Dec. 26, 2019 in corresponding Chinese Application No. 201710841623.5; 18 pages including machine-generated English-language translation.

Examination Report dated Jul. 24, 2020 of corresponding Chinese application No. 201710841623.5; 23 pgs.

Office Action dated Jan. 22, 2021 in corresponding Chinese Application No. 2017108416215; 8 pages including partial English-language translation.

* cited by examiner

ENERGY STORAGE SYSTEM FOR A MOTOR VEHICLE, MOTOR VEHICLE AND METHOD FOR PRODUCING AN ENERGY STORAGE SYSTEM

FIELD

The invention relates to an energy storage system for a motor vehicle, comprising an electrical energy storage device and a housing-like carrier element for the energy storage device, wherein a liquid heat-conducting medium is arranged in the intermediate space between the carrier element and the energy storage device, by means of which the energy storage device is thermally coupled to the carrier element.

BACKGROUND

Motor vehicles are typically provided with an electrical energy storage systems by means of which electrical users are supplied. Such a user can be for example an electrical engine of a partially or fully electrically driven motor vehicle. In order to construct such an energy storage device, one or several energy storage devices or energy storage modules are mounted on a housing-like carrier element. In order to improve the heat dissipation during the energy storage and/or energy output, it was already proposed to provide a thermal coupling between the energy storage device and the carrier element, wherein a liquid heat-conducting medium is arranged between the carrier element and the energy storage device.

Such a heat-conducting medium enables uniform heat conduction between the carrier element and the energy storage device and at it same time it fills the cavities that are created if the energy storage device were placed directly on the carrier element and that would be typically based on the manufacturer's tolerances. In this case, the heat-conducting mediums, which remain after the assembly of the energy storage device fluid or capable of flowing, have enormous advantages with respect to their processing within the context of the assembly over hardening heat-conducting means.

DE 10 2009 006 426 A1 discloses a battery comprising at least one battery cell which is arranged in a battery housing, wherein the battery housing is partially filled with a cooling liquid.

A disadvantage in this case is the flowing conduct of the heat-conducting medium. If for example the energy storage device is tilted, such a heat-conducting medium can flow away from the intermediate space, as a result of which a thermally poorly conductive air bridge will be created between the energy storage device and the carrier element.

SUMMARY

The objective of the invention is therefore to improve the thermal coupling between an energy storage device and a carrier element of an energy storage device.

This objective is achieved according to the invention with an energy storage device of the type described in the introduction, wherein a sealing element is provided between the carrier element and the energy storage device which prevents the heat-conducting medium from flowing away from the intermediate space.

The invention is based on the idea to fix the position of the heat-conducting medium between the energy storage device and the carrier element, wherein the intermediate space is delimited by a sealing element for the heat-conducting medium, which cannot be penetrated or which is difficult to be penetrated. In other words, the intermediate space is delimited in the assembled state of the energy storage device, preferably on all sides, by the energy storage device, the carrier element and the sealing element. In this manner, the energy storage device, whose position and/or orientation in the mounted state are subject to frequent variations, for example because they are arranged in moving motor vehicles, can also use the advantages of a liquid heat-conducting means.

These advantages are in particular good processing characteristics during the assembly, a low density of the heat-conducting means and the length of the lifespan of the medium in comparison to solid or quickly hardening heat conductors, which typically also become porous over time.

Accordingly, the heat-conducting means can be fluid, in particular non-hardening or only very slowly hardening. It is preferred when the heat-conducting medium is viscous or paste-like. The viscosity of the heat-conducting medium can be in particular at least one pascal-second, preferably at least 10 pascal-seconds. The viscosity of the heat-conducting means can be for example comparable to or even higher than that of syrup or honey. The heat-conducting medium can be a single-component material or a multi-component material. In particular when one-component materials are used, the problems that often occur with multi-component materials such as emissions, for example emissions of silicon, are avoided. As was mentioned in the introduction, the heat-conducting medium can be designed to fill the cavities of the carrier element and/or the cavities on the side of the energy storage device and/or so as to allow a uniform heat flow between the carrier element and the energy storage device. Accordingly, the heat-conducting medium can be referred to as a gap filler.

The sealing element is preferably formed from an elastically and/or plastically deformable material. It can be formed for example from an elastomer, from a foamed material, from silicon or from cork. The sealing material can be also attached as a module, or it can be attached in the housing. The energy storage device can comprise at least one energy storage module, or at least one energy storage cell and/or a housing. Typically, an electromechanical energy storage device is used, in particular one that is based on lithium.

In the case of the energy storage device according to the invention it is preferred when the energy storage device is tensioned inside the energy storage device when the energy storage device exerts a force on the sealing element.

In particular, the energy storage device is tensioned against the carrier element. Alternatively or additionally, it can be also provided that the energy storage device is mounted inside the energy storage system with a restoring means which applies a force in the direction of the sealing element. The restoring means is for example a spring and/or a cover element mounted on the wall opposite the carrier element, in particular a cover element that closes the carrier element. In both cases, the sealing element can be deformed by the force or the forces. In other words, the heat-conducting means cannot fill yet completely the free space created between carrier element and the energy storage device. During the assembly, the sealing element is compressed in such a way that the energy storage system is in thermally conductive coupling state in the mounted position. The energy storage system can thus be fixed in its mounted position by using tensioning or a restoring means.

It is further preferred when the sealing element is provided with at least one ventilation section. The ventilation section guarantees that the when the air is supplied into the energy storage system in the direction of the heat-conducting medium from the free space already defined by the energy storage device, as well as by the carrier element and by the sealing element, it can escape until the energy storage device comes into thermal contact with the heat-conducting medium. The ventilation section has for example a slot-like shape and/or it is perforated. It is expedient when the ventilation section is designed in such a way that in the mounted position, the heat-conducting medium cannot escape through it from the intermediate space.

According to a particularly preferred further development of the energy storage device according to the invention, the sealing element is arranged in a recess of the carrier element, wherein the bottom section of the energy storage device is at least partially engaged in a form-fitting manner in the recess.

In particular, only the bottom section and eventually or in addition also an edge area of the floor section will then be in contact with the heat-conducting medium. The sealing element can be at least partially fitted closely to a wall or to several walls of the recess.

The bottom section and/or the sealing element are preferably provided with a rectangular or with a circular outer shape.

Alternatively or in addition, the edge of the recess that engages the housing section of the energy storage device can be attached to the carrier element. The housing section, which can for example comprise several stages, can be penetrated by a fastening means, which extends into a notch provided on the side of the carrier element, in particular outside of the recess, for example a blind hole. It is preferred when the energy storage device is tensioned by the fastening means at the carrier element as mentioned above.

In addition, it is advantageous with the energy storage device according to the invention when the carrier element is designed as a temperature-regulating device of the energy storage device. As an alternative, a temperature-regulating device can be arranged on the side opposite the energy storage device. The temperature-regulating device is preferably designed to cool and/or to heat the energy storage device. The temperature device is provided for example with a plurality of fluid channels for a temperature-regulating fluid, wherein a particularly good thermal coupling of the temperature-regulating fluid is achieved with the energy storage device.

The objective on which the invention is based is further achieved with a motor vehicle comprising an energy storage system according to the invention, by means of which is supplied at least one electronic motor vehicle component. The electric motor vehicle component is preferably a drive device of the motor vehicle, which is designed for a partially or completely electric operation of the motor vehicle.

In addition, the objective on which the invention is based is achieved by a method for producing an energy storage system, in particular for a motor vehicle, comprising a housing-like carrier element and an electric energy storage device, wherein a liquid heat-conducting medium is arranged in a free space between the carrier element and the energy storage device by means of which the energy storage device is thermally coupled to the carrier element, wherein a sealing element is used which prevents the heat-conducing medium from flowing away in the mounted state of the energy storage system from an intermediate space between the energy storage device and the carrier element.

With the method according to the invention it is preferred when the sealing element is arranged on the side of the carrier element, in particular in a recess of the carrier element, so that the heat-conducting element is then introduced into a free space delimited by the sealing element and the carrier element, and wherein the energy storage device is arranged on the sealing element while being engaged by the bottom section, in particular in the recess.

In an alternative further development of the method according to the invention, it can be provided that the heat-conducting medium is applied to the carrier element, so that the energy storage device then is then arranged to be contact with or partially immersed in the heat-conducting medium inside the energy storage device, and the sealing element is then arranged between the carrier element and the energy storage device.

Finally, according to the method of the invention it can be provided that the energy storage device, which is arranged on the sealing element, is tensioned in its mounted position by a force exerted on the sealing element inside the energy storage device and/or by a force exerted in the direction of the sealing element, while also being supported by a restoring means mounted inside the energy storage means, whereby the sealing element is deformed by the force or forces.

All the embodiments of the energy storage device according to the invention can be applied an analogous manner also to the motor vehicle according to the invention and to the method according to the invention, so that the advantages mentioned above can be achieved also in this manner.

BRIEF DESCRIPTION OF THE DRAWINGS

Other advantages and details of the invention will become apparent from the embodiments described below, as well as from the figures. The figures are schematic representations showing the following.

DETAILED DESCRIPTION OF THE DRAWINGS

Figure 1:
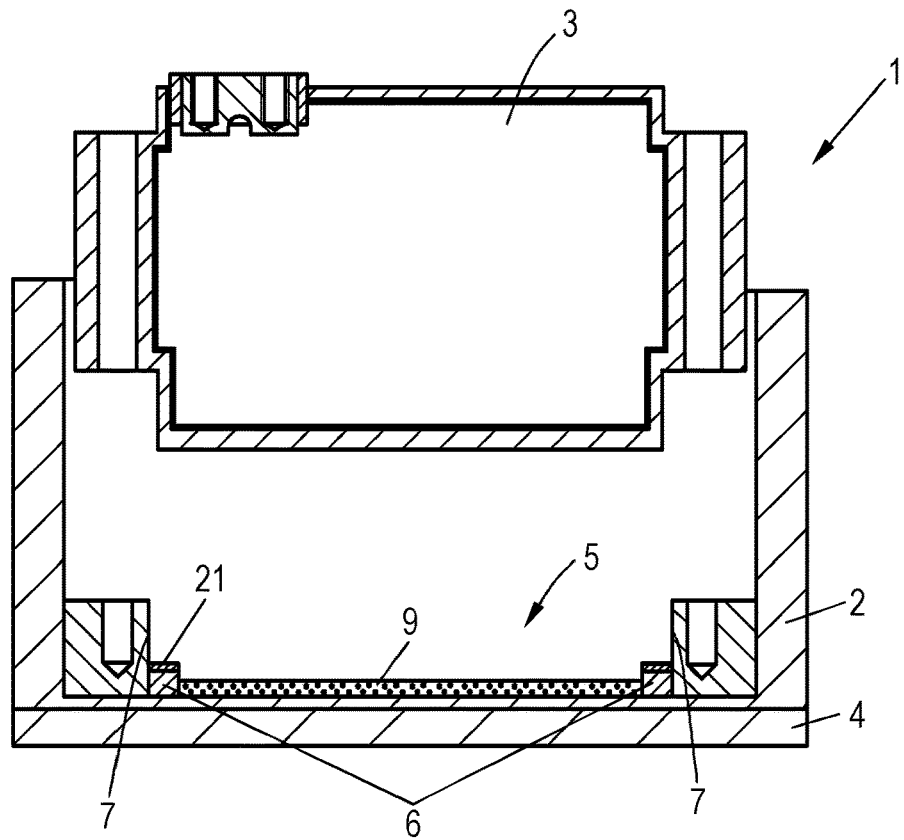
FIG. 1 a sectional view of an energy storage device according to the invention during the assembly.

FIG. 1 shows a sectional view of an energy storage system 1 during its assembly, comprising a housing-like carrier element 2 and an energy storage device 3, for example an energy storage module or one or a plurality of energy storage cells, which are accommodated in a housing of the energy storage device 3. In addition, a temperature-regulating device 4, which is designed to cool and/or to heat the energy storage device 3, is arranged on the energy storage device 3 on the opposite side of the carrier element 2. As an alternative, the carrier element 2 itself can be designed as a temperature-regulating device 4.

The carrier element 2 is provided with a recess 5, inside of which is deployed a rectangular sealing element 6 made of an elastomer, foamed material, silicon or cork, so that it is inserted immediately adjacent to walls 7 of the recess 5. After the insertion, a free space delimited by the sealing element 6 and by the carrier element 2 is filled with a liquid, in particular with a pasty and viscous heat-conducting medium 9, which has for example a viscosity of 10 pascal-seconds.

Figure 2:
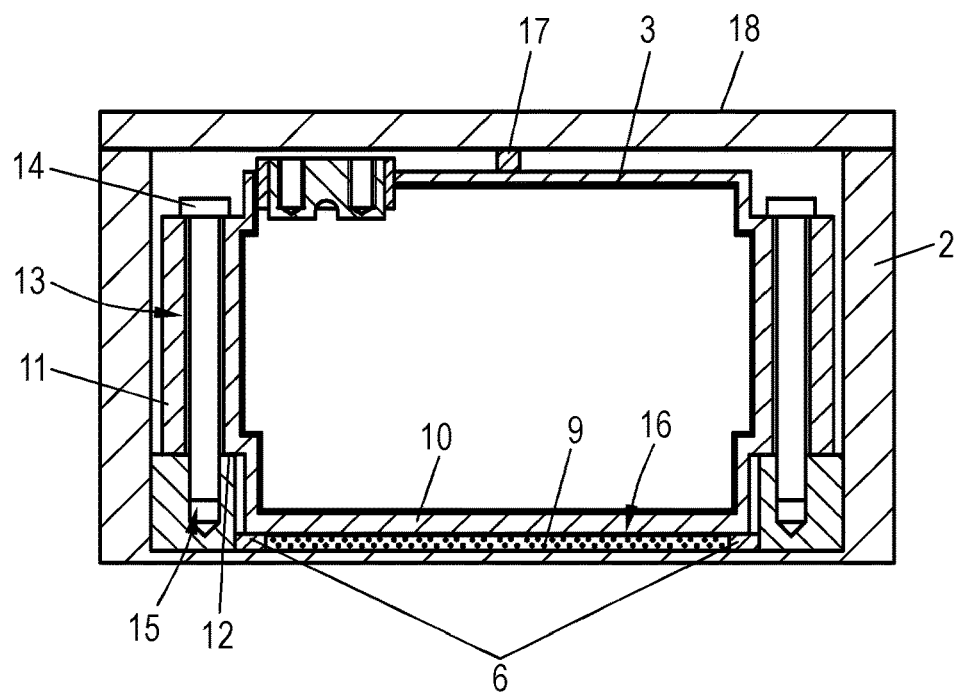
FIG. 2 a sectional view of the energy storage device according to the invention in a mounted position.

FIG. 2 shows a sectional view of the energy storage system 1 in a mounted state, which is arranged on the sealing element 6 to be accommodated thereupon. In this case, a bottom section 10 of the energy storage device 3, which is designed as a rectangular sealing element 6, is form-fittingly engaged in the recess 5, wherein respective stepwise housing sections 11 that are set off from the bottom section 3 overlap an edge 12 of the recess 5. The housing sections 11 are provided with one or with several through-openings 13, into which is introduced a fastening element 14 which extends into a blind hole 15 on the side of the carrier.

The energy storage device 3 is tensioned by a force exerted by means of the fastening element 14 onto the sealing element 6 against the carrier element 2, whereby the sealing element 6 is deformed so far that the bottom section 10 directly touches the heat-conducting medium 9 with its carrier element 2. The heat-conducting medium thus fills completely an intermediate space 16, which is delimited by the carrier element 2, by the energy storage device 3 and by the sealing element 6. In order to allow the air to escape during the tensioning of the energy storage device 3, the sealing element 6 is provided with one or several slot-shaped ventilation sections 21. Alternatively to a slot-shaped design, respective ventilation sections 21 can be also perforated.

Additionally or alternatively to tensioning of the energy storage 3, a restoring means 17, for example a spring, can be provided, which is arranged on the side of the energy storage device 3 located opposite the intermediate space 16 and which exerts a restoring force after a cover element 18 has been put on the carrier element 2, by means of which the sealing element 6 is deformed.

Figure 3:
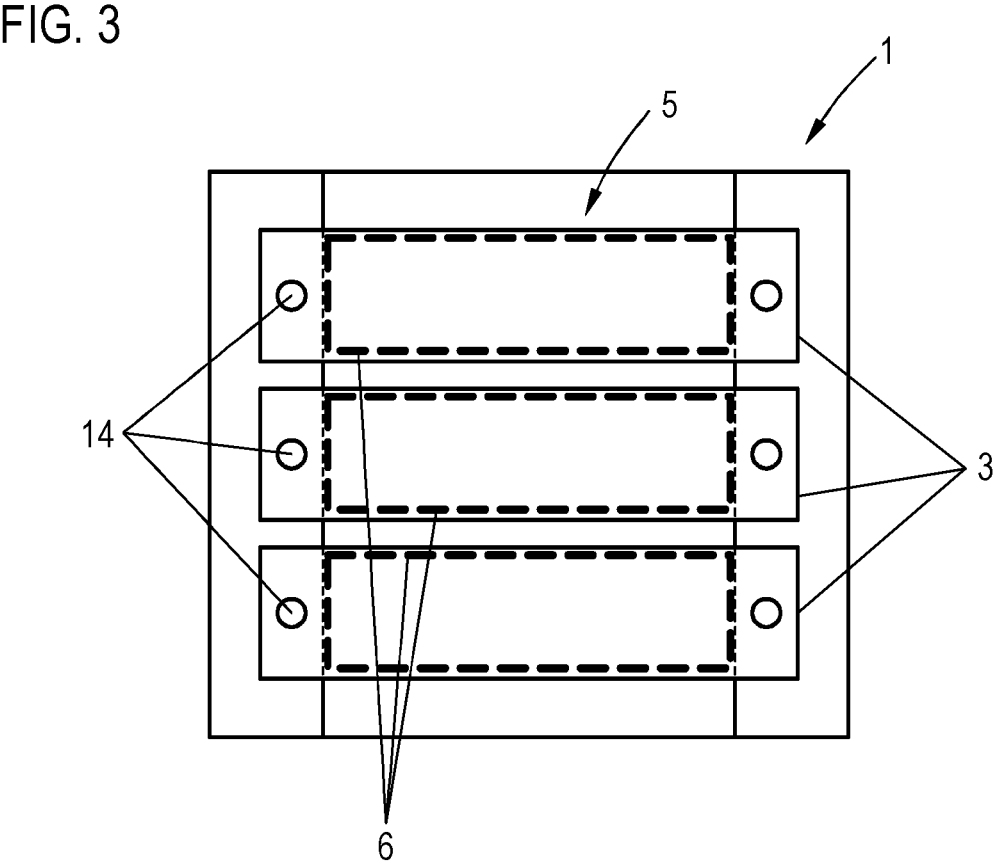
FIG. 3 a top view of the energy storage device.

FIG. 3 shows a top view of the energy storage system 1 without the cover element 18. It is evident that in addition to the energy storage device 3 shown in the sectional views, two other energy storage devices 3 are provided, having bottom sections 10 which are respectively engaged in the recess 5. In the area of the recess 5, for each energy storage device 3 is provided a sealing element 6 that prevents the heat-conducting medium 9 from flowing away as described above.

According to another embodiment, not shown here, the energy storage system 1 is produced so that first, the heat-conducting medium 9 is applied to a carrier element 2 and after that, the energy storage device 3 is arranged inside the energy storage system 1 so that it partially touches the heat-conducting medium or is immersed in it, in particular also by being attached therein. After that, the sealing element is arranged between the carrier element 2 and the energy storage device 3, for example so that it is pushed between the bottom section 10 and the carrier element 2.

Figure 4:
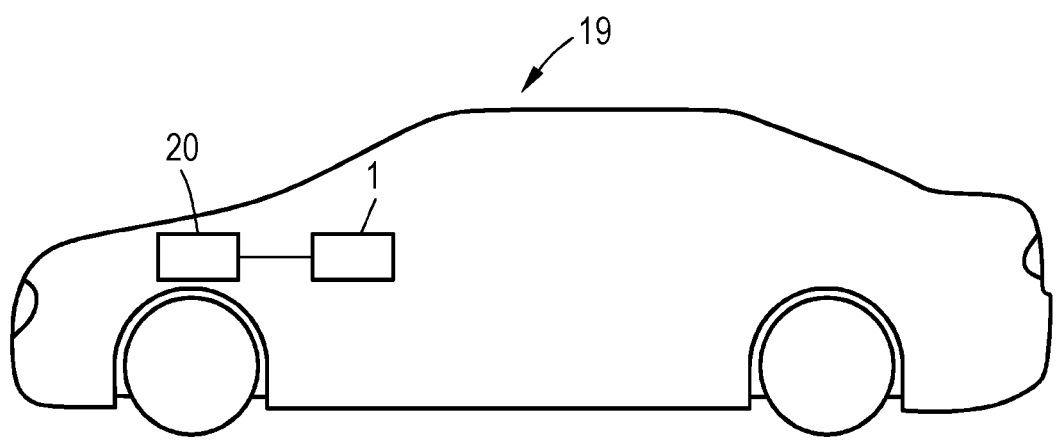
FIG. 4 a motor vehicle according to the invention.

FIG. 4 shows a principle diagram of a motor vehicle 19, comprising an energy storage system 1 according to one of the preceding embodiment, by means of which electric power can be supplied to a motor vehicle component 20, for example a drive device of the motor vehicle.

The invention claimed is:

1. An energy storage system for a motor vehicle, comprising:
   an electric energy storage device;
   a housing-like carrier element for the energy storage device;
   a sealing element; and
   a liquid heat-conducting medium,
   wherein the sealing element is extended between the carrier element and the energy storage device to form an intermediate space that is bounded by the carrier element, the energy storage device, and the sealing element,
   wherein the liquid heat-conducting medium is arranged in the intermediate space such that the liquid heat-conducting medium directly contacts both the carrier element and the energy storage device,
   wherein the carrier element and the energy storage device are thermally coupled via the liquid heat-conducting medium, and
   wherein the sealing element prevents the liquid heat-conducting medium from flowing away from the intermediate space,
   wherein the energy storage device is tensioned inside the energy storage system by a force exerted on the sealing element by one or more fastening elements which directly fasten the energy storage device to the carrier element, and by a restoring mechanism mounted between a top surface of the energy storage device and a cover element arranged on the carrier element, wherein the sealing element is deformed by the forces.

2. The energy storage system according to claim 1, wherein the sealing element is equipped with at least one ventilation section.

3. The energy storage system according to claim 1, wherein the sealing element is arranged in a recess of the carrier element, wherein a bottom section of the energy storage device is form-fittingly engaged at least partially in the recess.

4. The energy storage system according to claim 3, wherein the bottom section and the sealing element are provided with a rectangular or circular external form.

5. The energy storage system according to claim 3, wherein a housing section of the energy storage device engaging an edge of the recess is fastened to the carrier element by the one or more fastening elements.

6. The energy storage system according to claim 1, wherein the carrier element is designed as a temperature-regulating device of the energy storage device, or a temperature-regulating device is arranged on the site located opposite the energy storage device.

* * * * *